United States Patent
Wegleitner

(10) Patent No.: US 12,263,775 B2
(45) Date of Patent: Apr. 1, 2025

(54) CAMPER TRAILER ASSEMBLY

(71) Applicant: Daniel Wegleitner, Duluth, MN (US)

(72) Inventor: Daniel Wegleitner, Duluth, MN (US)

( * ) Notice: Subject to any disclaimer, the term of this patent is extended or adjusted under 35 U.S.C. 154(b) by 261 days.

(21) Appl. No.: 17/973,878

(22) Filed: Oct. 26, 2022

(65) Prior Publication Data

US 2024/0140296 A1 May 2, 2024

(51) Int. Cl.
*B60P 3/34* (2006.01)
*B60P 3/36* (2006.01)

(52) U.S. Cl.
CPC .............. *B60P 3/34* (2013.01); *B60P 3/341* (2013.01); *B60P 3/36* (2013.01)

(58) Field of Classification Search
CPC .... B60P 3/34; B60P 3/36; B60P 3/341; B60P 3/39
USPC .................. 296/173, 174, 168, 169
See application file for complete search history.

(56) References Cited

U.S. PATENT DOCUMENTS

| | | | | |
|---|---|---|---|---|
| 2,493,258 A * | 1/1950 | Massare | ................. | B60P 3/341 280/166 |
| 2,719,054 A * | 9/1955 | Jennings | ................. | B60P 3/341 296/50 |
| 2,845,663 A * | 8/1958 | Harr | ..................... | B62D 63/064 52/27 |
| 3,352,596 A * | 11/1967 | Escoto | ..................... | B60P 3/34 D12/104 |
| 3,749,439 A * | 7/1973 | Ferguson | ................. | B60P 3/341 296/26.05 |
| 4,113,301 A * | 9/1978 | Olmstead | ................ | B60P 3/341 296/161 |
| 4,165,117 A | 8/1979 | Kaiser | | |
| 6,102,468 A * | 8/2000 | Lowrey | ................... | B60P 3/341 296/173 |
| 6,739,617 B1 * | 5/2004 | Martin | .................... | B60P 3/341 280/789 |
| 6,802,327 B2 | 10/2004 | Koss | | |
| 6,910,192 B2 | 6/2005 | Stuck | | |
| 6,910,492 B1 * | 6/2005 | Stuck | ...................... | E04H 15/06 296/161 |
| D603,299 S | 11/2009 | Prusmack | | |
| 7,810,866 B2 * | 10/2010 | Dempsey | ............. | B62D 63/062 296/173 |
| 8,632,119 B2 | 1/2014 | Mazac | | |
| 2005/0146125 A1 | 7/2005 | Wheeler | | |
| 2006/0208462 A1 | 9/2006 | Spence | | |
| 2014/0083335 A1 | 3/2014 | Mayhood | | |

* cited by examiner

*Primary Examiner* — Amy R Weisberg
*Assistant Examiner* — Denise L. Esquivel

(57) ABSTRACT

A camper trailer assembly includes a trailer that has a hitch and a pair of wheels for towing by an all terrain vehicle. A pair of panels is hingedly coupled to a box of the trailer and each of the panels is positionable to extend laterally away from the box such that each of the panels defines a pair of sleeping areas. A canopy is attached to the box and the canopy is urgeable into a raised condition when the panels are in the deployed position such that the canopy and the box define a camper. A lifting unit is movably integrated into the box and the lifting unit urges the canopy into the raised condition when a hand crank is cranked in a first direction. The lifting unit urges the canopy to collapse into the box when the hand crank is cranked in a second direction.

10 Claims, 12 Drawing Sheets

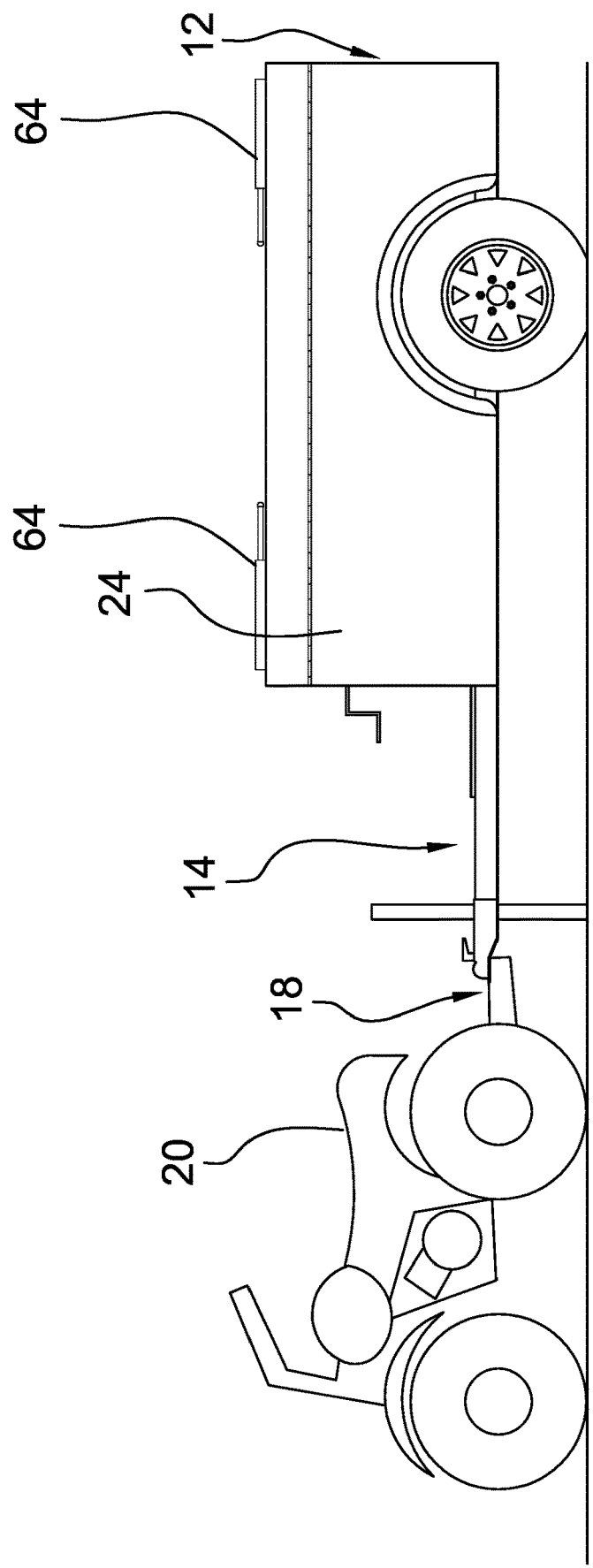

CAMPER TRAILER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to camper devices and more particularly pertains to a new camper device for towing a portable camper behind an all terrain vehicle. The device includes a trailer with dimensions being sufficiently small for towing behind an all terrain vehicle. The device includes a canopy that is attached to a box of a trailer and a pair of panels that are foldable outwardly to define a pair of beds for sleeping. The device includes a lifting unit for moving the canopy into a raised condition for defining a camper or a collapsed condition for storing within the trailer.

(2) Description of Related Art Including Information Disclosed Under 37 CFR 1.97 and 1.98

The prior art relates to camper devices including a camper trailer that includes a pair of outer walls, each comprised of a plurality of hinged sections, thereby facilitating the outer walls to be extended into a deployed position or folded into collapsed position. The prior art discloses a portable camper comprising a frame being attachable to an all terrain vehicle and a clamshell canopy being positionable over the frame. The prior art discloses a portable shelter device that includes a frame which is pivotally coupled to an all terrain vehicle and a canopy integrated into said frame such that the canopy defines a shelter when the frame is positioned in a deployed position. The prior art discloses a camper having a teardrop shaped outer wall which includes a first half being spaceable from a second half to define a bed for sleeping. The prior art discloses a portable camper including a trailer for towing behind an all terrain vehicle and a clamshell canopy being movably attached to the trailer.

BRIEF SUMMARY OF THE INVENTION

An embodiment of the disclosure meets the needs presented above by generally comprising a trailer that has a hitch and a pair of wheels for towing by an all terrain vehicle. A pair of panels is hingedly coupled to a box of the trailer and each of the panels is positionable to extend laterally away from the box such that each of the panels defines a pair of sleeping areas. A canopy is attached to the box and the canopy is urgeable into a raised condition when the panels are in the deployed position such that the canopy and the box define a camper. A lifting unit is movably integrated into the box and the lifting unit urges the canopy into the raised condition when a hand crank is cranked in a first direction. The lifting unit urges the canopy to collapse into the box when the hand crank is cranked in a second direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a left side view of a camper trailer assembly according to an embodiment of the disclosure.

DETAILED DESCRIPTION OF THE INVENTION

Figures 2, 3:
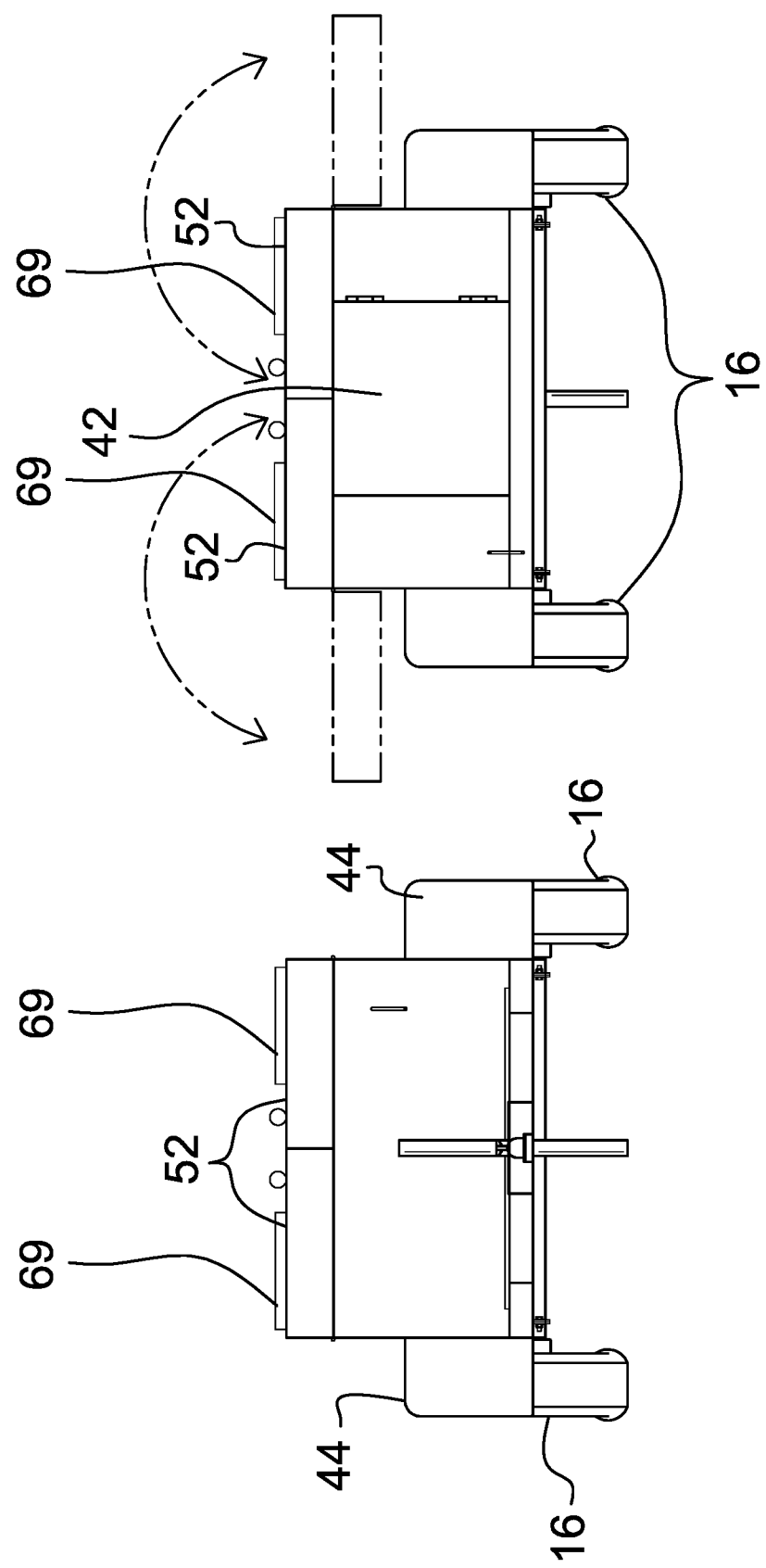
FIG. 2 is a front view of an embodiment of the disclosure.
FIG. 3 is a back view of an embodiment of the disclosure.
Figure 4:
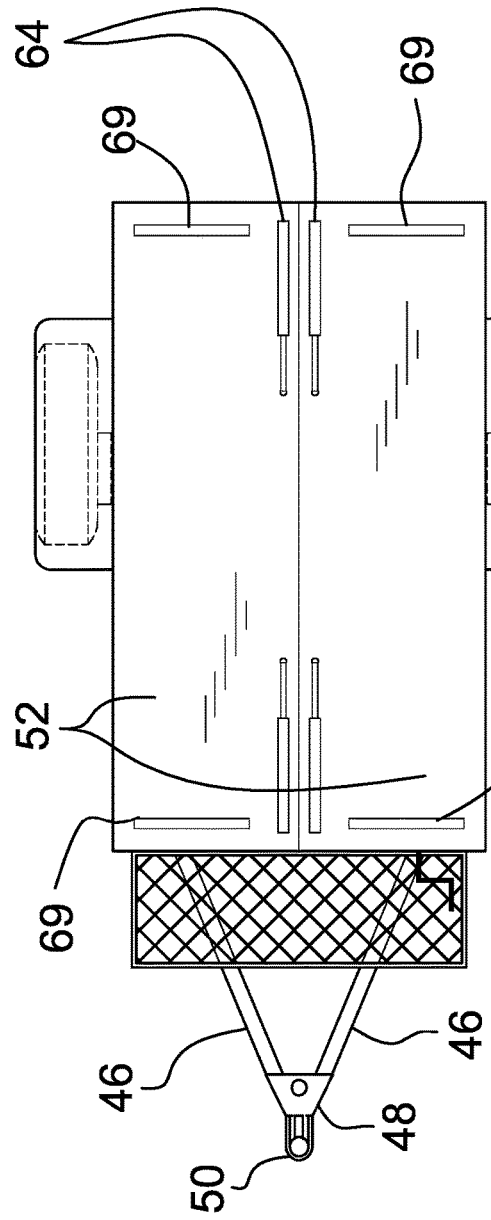
FIG. 4 is a top view of an embodiment of the disclosure.
Figure 5:
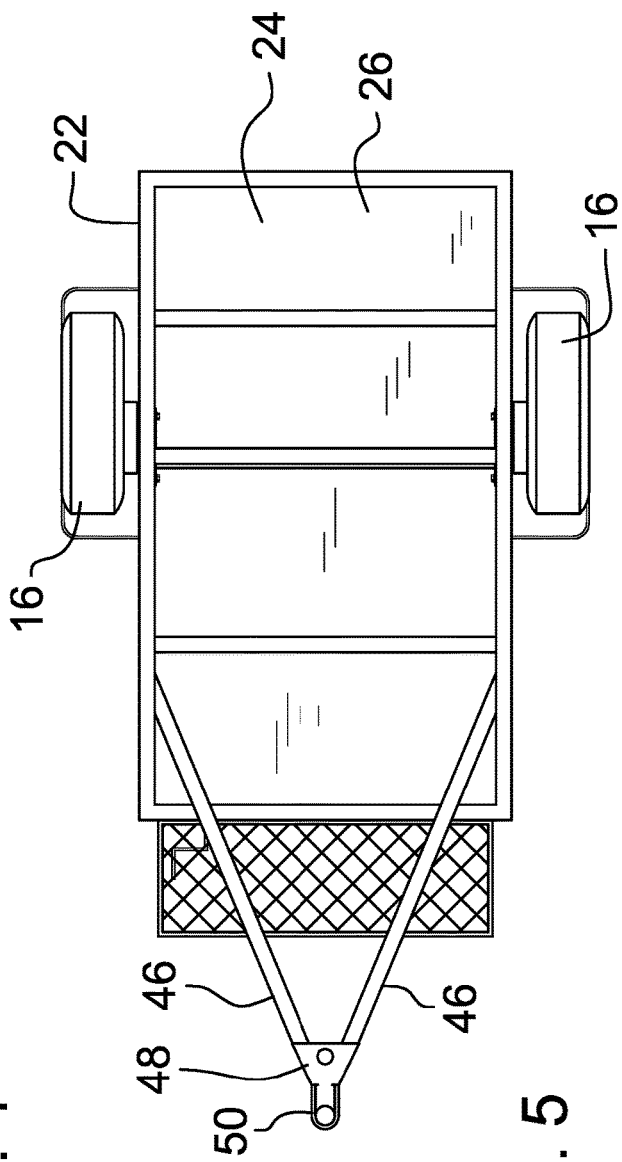
FIG. 5 is a bottom view of an embodiment of the disclosure.
Figure 6:
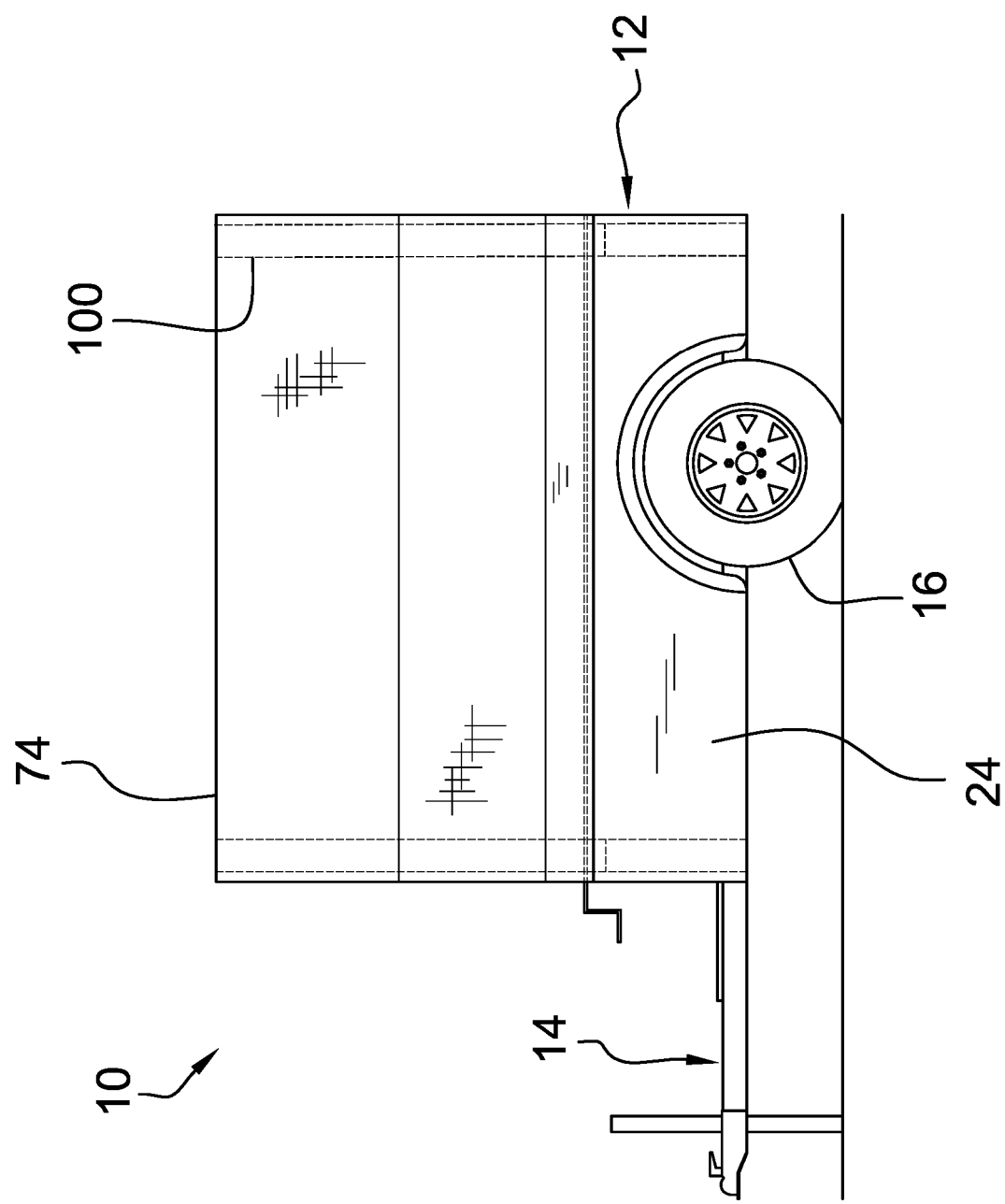
FIG. 6 is a left side view of an embodiment of the disclosure showing a canopy in a raised condition.
Figure 7:
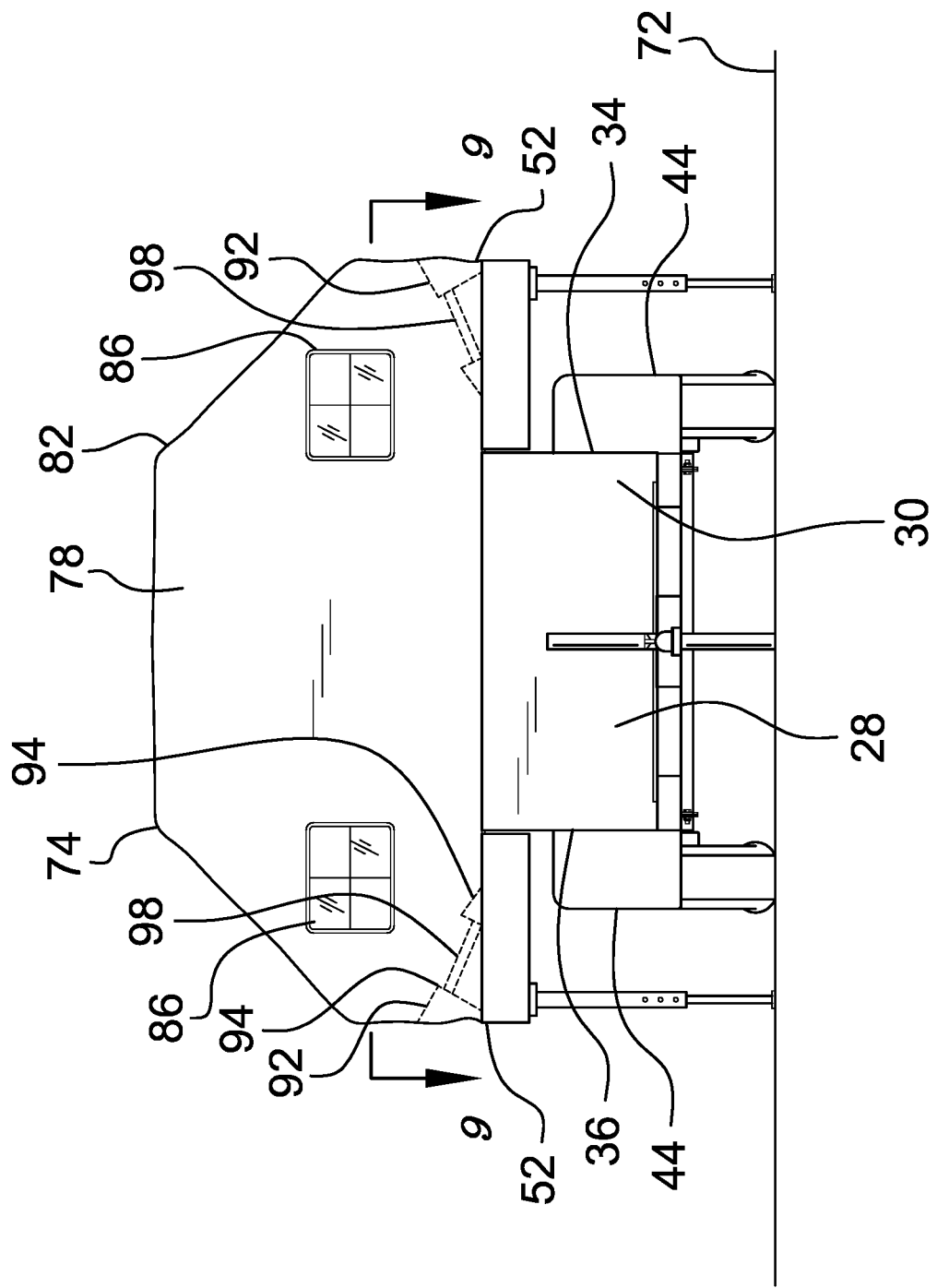
FIG. 7 is a front view of an embodiment of the disclosure showing a canopy in a raised condition.
Figure 8:
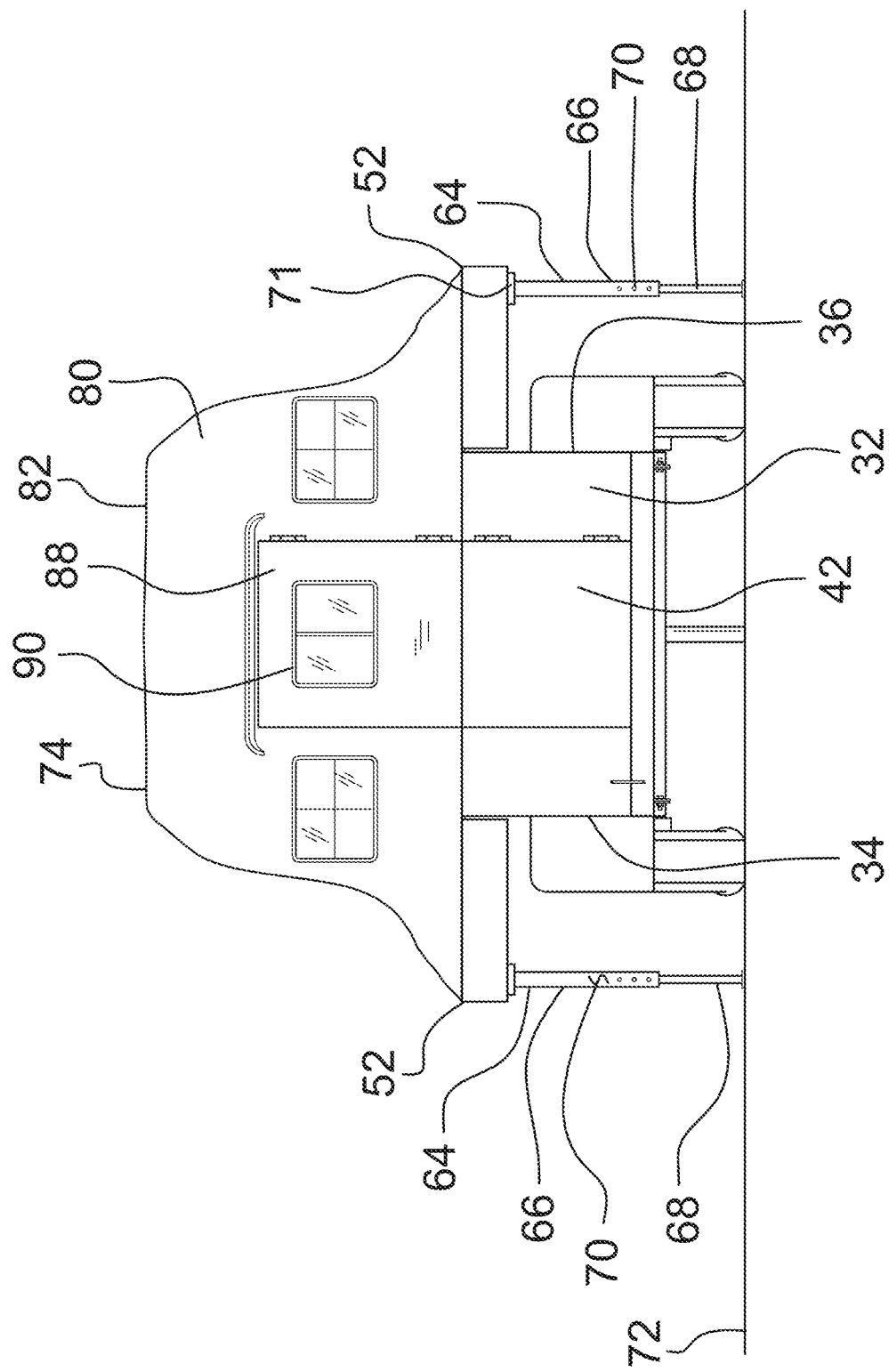
FIG. 8 is a back view of an embodiment of the disclosure showing a canopy in a raised condition.
Figure 9:
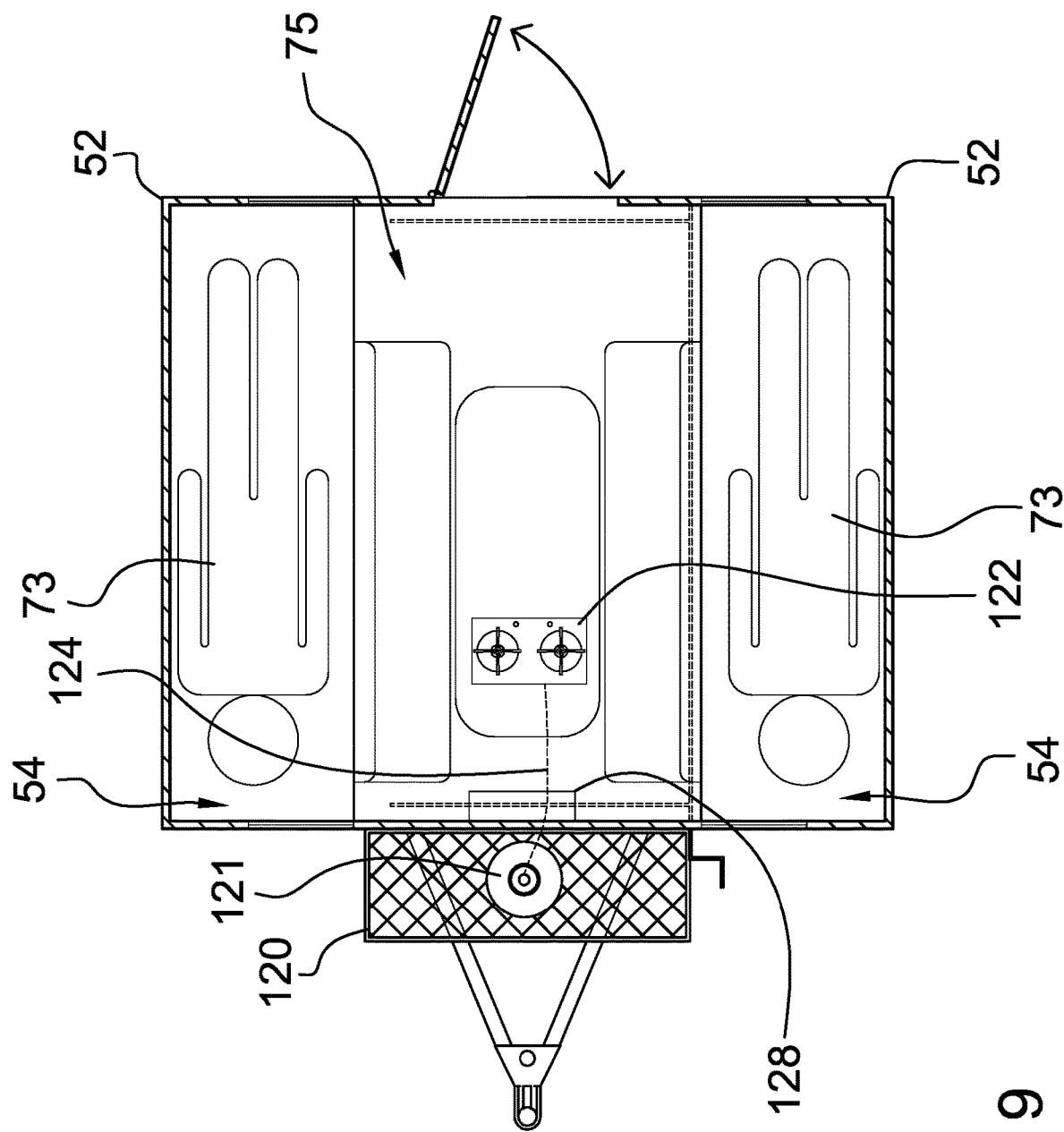
FIG. 9 is a cross sectional view taken along line 9-9 of FIG. 7 of an embodiment of the disclosure.
Figure 10:
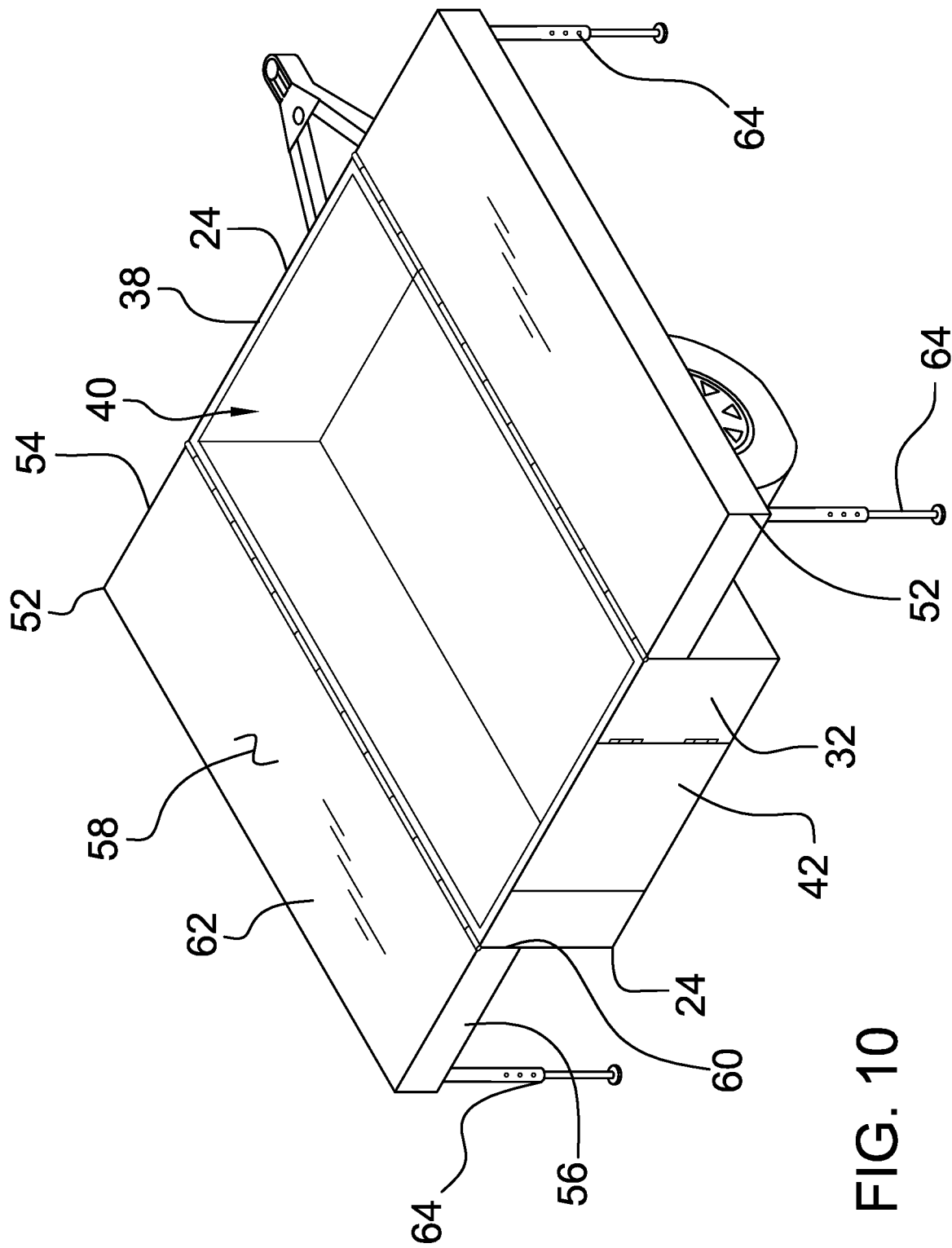
FIG. 10 is a top perspective view of an embodiment of the disclosure showing a pair of panels in a deployed position.
Figure 11:
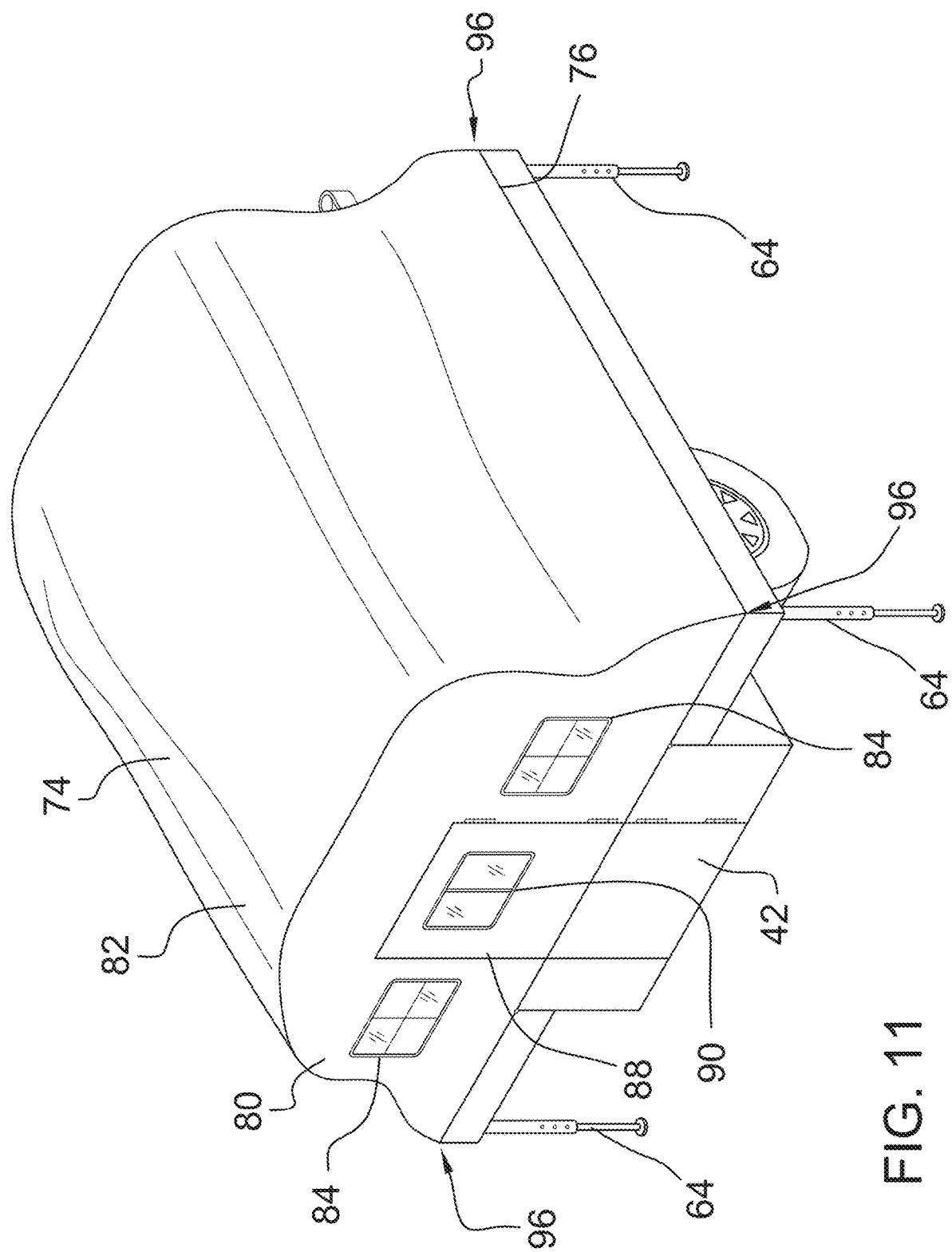
FIG. 11 is a top perspective view of an embodiment of the disclosure showing a canopy in a raised condition.
Figure 12:
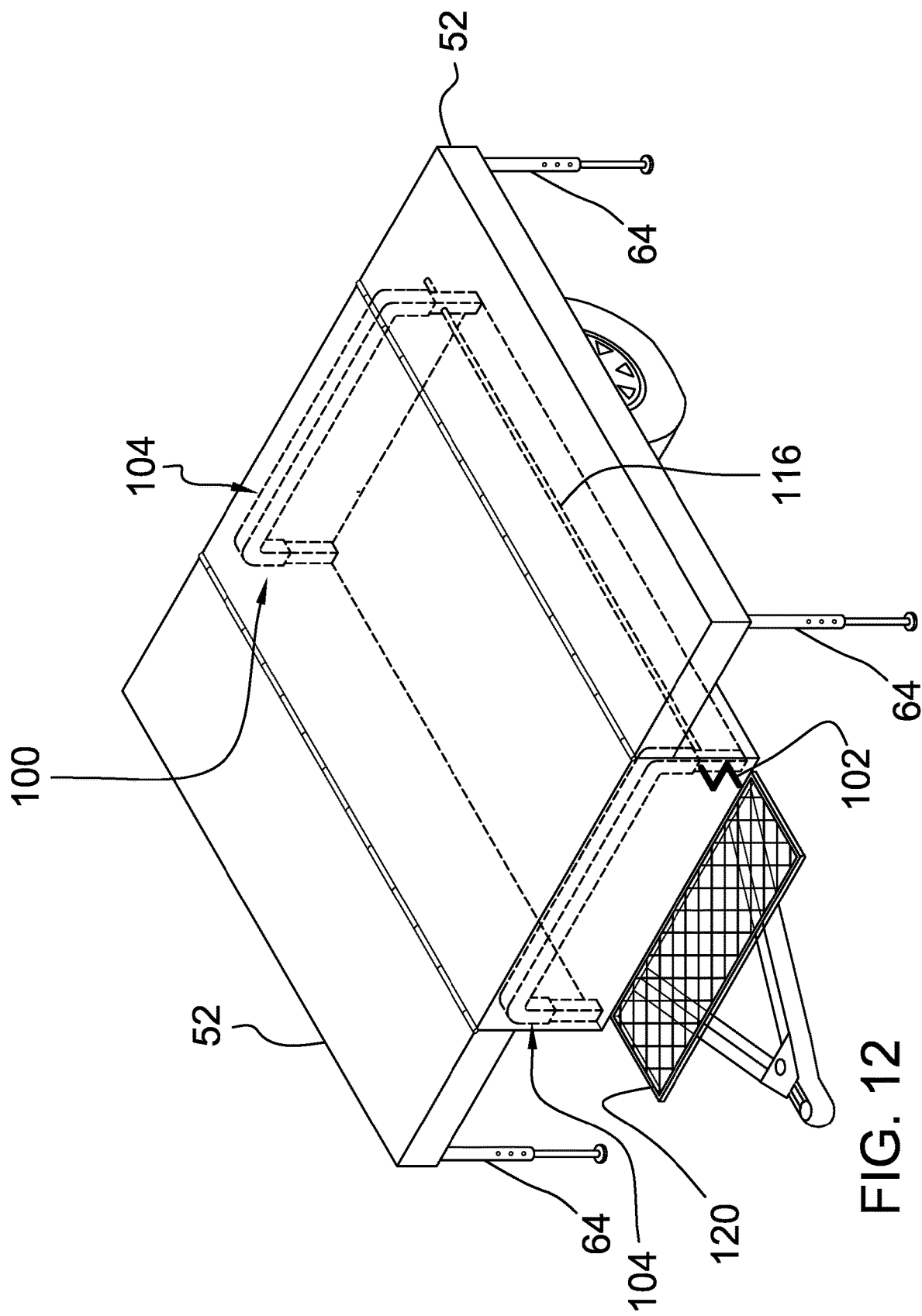
FIG. 12 is a top perspective view phantom view of an embodiment of the disclosure showing a pair of panels in a deployed position and showing a lifting unit.
Figure 13:
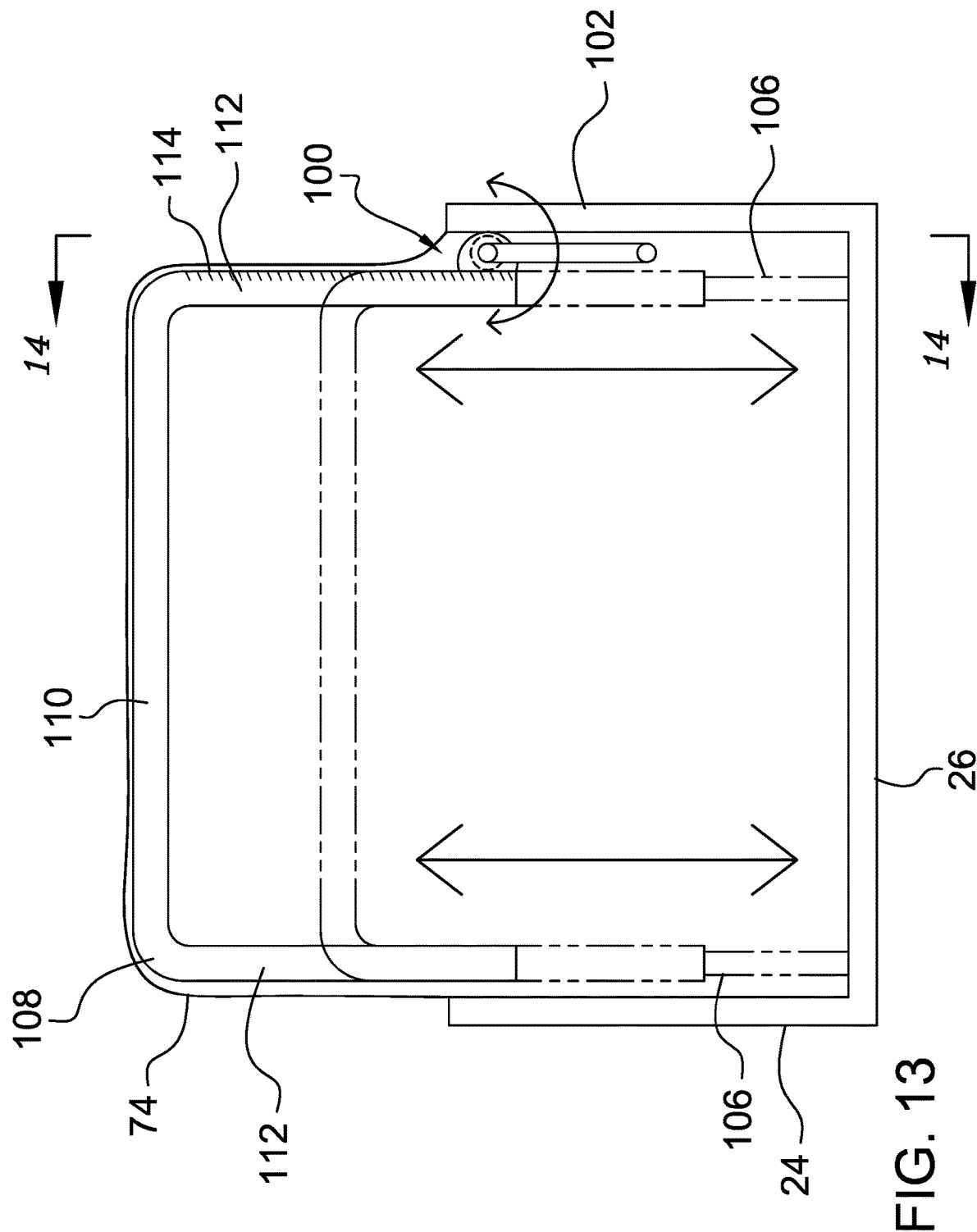
FIG. 13 is a front cut-away view of an embodiment of the disclosure.
Figure 14:
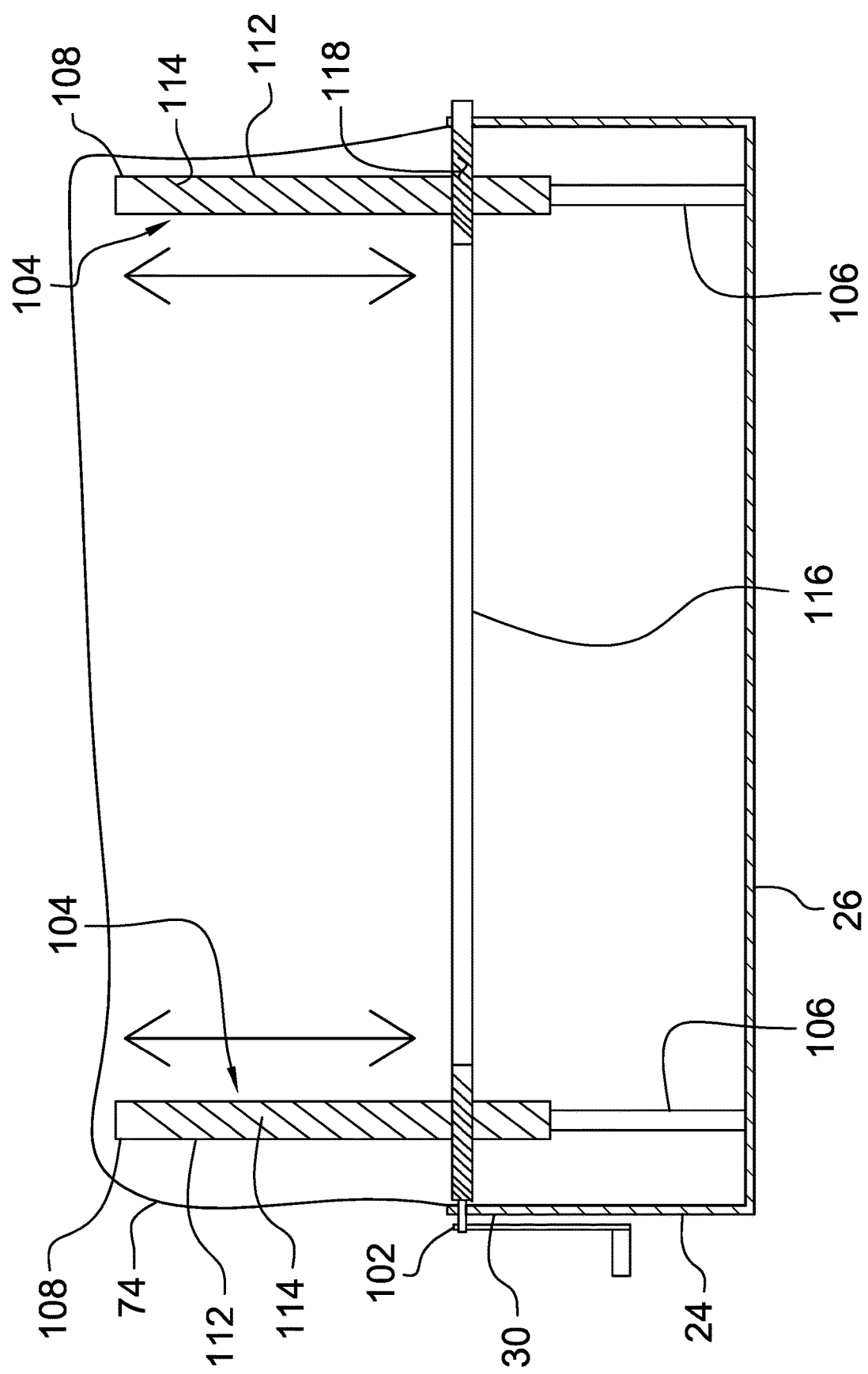
FIG. 14 is a cross sectional view taken along line 14-14 of FIG. 13 of an embodiment of the disclosure.

With reference now to the drawings, and in particular to FIGS. 1 through 14 thereof, a new camper device embodying the principles and concepts of an embodiment of the disclosure and generally designated by the reference numeral 10 will be described.

As best illustrated in FIGS. 1 through 14, the camper trailer assembly 10 generally comprises a trailer 12 that has a hitch 14 and a pair of wheels 16. The hitch 14 is attachable to a hitch ball 18 on an all terrain vehicle 20 and the trailer 12 has dimensions that are sufficiently small to facilitate the trailer 12 to be safely towed by the all terrain vehicle 20. The all terrain vehicle 20 may be a quad, a side by side utility vehicle or other type of recreational vehicle that is commonly driven off road. Furthermore, the all terrain vehicle 20 may have a towing capacity that is significantly less than the towing capacity of a typical on-road vehicle. The trailer 12 has a frame 22 and a box 24 positioned on the frame 22, and the box 24 has a bottom wall 26 and an outer wall 28 extending upwardly from the bottom wall 26. The outer wall 28 has a front side 30, a back side 32, a first lateral side 34 and a second lateral side 36, and the outer wall 28 has a top edge 38 defining an opening 40 into the box 24. The bottom wall 26 rests on the frame 22 of the trailer 12 and the outer wall 28 has a door 42 that is hingedly integrated into the back side 32 for entering and exiting the box 24. The box 24 may have a length of approximately 200.0 cm, a width of approximately 122.0 cm and a height of approximately 76.0 cm.

The trailer 12 has a pair of fenders 44 that is each disposed on a respective one of the first lateral side 34 and the second lateral side 36 of the outer wall 28 of the box 24. Each of the wheels 16 is positioned beneath a respective one of the fenders 44, and the hitch 14 includes a pair of hitch members 46 each extending forwardly with respect to the front side 30 of the outer wall 28 of the box 24. The hitch members 46 intersect each other at a point 48 that is spaced from the front side 30. The hitch 14 includes a ball receiver 50 that is disposed on the point 48 at which the hitch members 46 intersect for engaging the hitch ball 18 on the all terrain vehicle 20.

A pair of panels 52 is provided and each of the panels 52 is hingedly coupled to the box 24 of the trailer 12. Each of the panels 52 is positionable in a closed position having the panels 52 closing the box 24. Each of the panels 52 is positionable in a deployed position having each of the panels 52 extending laterally away from the box 24 such that each of the panels 52 defines a pair of sleeping areas 53. Each of the panels 52 has a front end 54, a back end 56 and an outer surface 58 extending between the front end 54 and the back end 56, and the outer surface 58 has a lateral side 60 and an upper side 62. Furthermore, each of the panels 52 is elongated between the front end 54 and the back end 56.

An intersection between the lateral side 60 and the upper side 62 of the outer surface 58 of each of the panels 52 is hingedly coupled to a respective one of the first lateral side 34 and the second lateral side 36 of the outer wall 28 of the box 24 of the trailer 12. The lateral side 60 of the outer surface 58 of each of the panels 52 abuts the respective first lateral side 34 or second lateral side 36 of the outer wall 28 of the box 24 when the panels 52 are in the deployed position has the upper side 62 of the outer surface 58 of each of the panels 52 lying on a horizontal plane. Each of the panels 52 extends between the front side 30 and the back side 32 of the outer wall 28 of the box 24 of the trailer 12. The upper side 62 of the outer surface 58 of each of the panels 52 rests on the top edge 38 of the outer wall 28 of the box 24 when the panels 52 are positioned in the closed position such that the panels 52 close the opening 40 defined by the top edge 38.

A plurality of braces 64 is provided and each of the braces 64 comprises a tube 66 slidably receiving a member 68 such that each of the braces 64 has a telescopically adjustable length. The tube 66 of each of the braces 64 has a locking element 70 which releasably engages the member 68 of a respective brace 64 for retaining the respective brace 64 at a desired length. An upper end 71 of the tube 66 of each of the braces 64 is hingedly coupled to an outer surface 75 of a respective one of the panels 52. Each of the braces 64 being positionable in a deployed position when the respective panel 52 is positioned in the deployed position having each of the braces 64 extending between the respective panel 52 and a support surface 72. In this way each of the panels 52 can support the weight of a person 73 lying on the sleeping area 54. Each of the braces 64 is positionable in stored position having each of the braces 64 lying on the outer surface 75 of the respective panel 52 when the respective panel 52 is positioned in the closed position. A pair of canoe racks 69 is provided and each of the canoe racks 69 is attached to the outer surface 75 of a respective one of the panels 52 for supporting a canoe, or other personal water craft, when the panels 52 are in the deployed position.

A canopy 74 is attached to the box 24 and the canopy 74 is collapsed within the box 24 when the panels 52 are in the closed position. Conversely, the canopy 74 is urgeable into a raised condition when the panels 52 are in the deployed position such that the canopy 74 and the box 24 define a camper 75. The canopy 74 has a perimeter edge 76 that is attached to each of the panels 52 and the top edge 38 of the box 24 corresponding to each of the front side 30 and the back side 32 of the outer wall 28 of the box 24. Furthermore, the perimeter edge 76 of the canopy 74 extends around the upper side 62 of the outer surface 58 of each of the panels 52. In this way the sleeping areas 53 defined by the panels 52 are positioned inside of the camper 75 defined by the canopy 74 and the box 24 to facilitate the person 73 to sleep in a warm and dry environment. The canopy 74 may be comprised of a deformable and fluid impermeable material, including but not being limited to, canvas or vinyl, to facilitate an interior of the camper 75 to be kept dry during inclement weather.

The canopy 74 has a front wall 78, a back wall 80 and a top wall 82 extending between the front wall 78 and the back wall 80, and the top wall 82 curves upwardly from the box 24 and the panels 52 when the canopy 74 is in the raised condition. Each of the front wall 78 and the back wall 80 lies on a plane that is oriented coplanar with a respective one of the front side 30 and the back side 32 of the outer wall 28 of the box 24 when the canopy 74 is in the raised condition. The canopy 74 has a pair of back windows 84 each integrated into the back wall 80 of the canopy 74 and the canopy 74 has a pair of front windows 86 each integrated into the front wall 78 of the canopy 74. Additionally, a doorway 88 is integrated into the back wall 80 of the canopy 74 to facilitate entering and exiting the camper 75 defined by the canopy 74 and the box 24, and a window 90 is integrated into the doorway 88. The doorway 88 is aligned with the door 42 in the back side 32 of the outer wall 28 of the box 24.

The canopy 74 has a plurality of pockets 92 that is each integrated into an inside surface of the canopy 74. The plurality of pockets 92 includes a plurality of sets of pockets 94 and each of the sets of pockets 94 is positioned adjacent to an intersection between the perimeter edge 76 of the canopy 74 and an intersection between a respective one of the front wall 78 and the back wall 80 of the canopy 74. In this way each of the sets of pockets 94 is aligned with a respective one of four corners 96 of the canopy 74. Additionally, each of the sets of pockets 94 is spaced apart from each other and is directed toward each other. A plurality of corner supports 98 is provided and each of the corner supports 98 is positionable to extend between each of a respective one of the sets of pockets 94. In this way the top wall 82 of the canopy 74 is spaced from the upper side 62 of the outer surface 58 of each of the panels 52 of each of the panels 52 when the panels 52 are in the deployed position and the canopy 74 is in the raised condition.

A lifting unit 100 is movably integrated into the box 24 and the lifting unit 100 is in communication with the canopy 74. The lifting unit 100 includes a hand crank 102 and the lifting unit 100 urges the canopy 74 into the raised condition when the hand crank 102 is cranked in a first direction. The lifting unit 100 urges the canopy 74 to collapse into the box 24 when the hand crank 102 is cranked in a second direction. The lifting unit 100 comprises a pair of lifts 104 that each includes a pair of uprights 106 and a cross member 108 slidably engaging each of the uprights 106. Each of the uprights 106 extends upwardly from the bottom wall 26 of the box 24. The cross member 108 includes a central portion 110 extending between a pair of end portions 112, and each of the end portions 112 is perpendicularly oriented with the central portion 110. Each of the end portions 112 is substantially hollow and each of the end portions 112 slidably receives a respective one of the uprights 106.

Each of the end portions 112 has an exterior wall 114 and the exterior wall 114 of each of the uprights 106 is threaded. Each of the lifts 104 is positioned adjacent to a respective one of the front side 30 and the back side 32 of the outer wall 28 of the box 24 having the central portion 110 of the cross member 108 of each of the lifts 104 extending laterally across the respective front side 30 and the back side 32 of the outer wall 28 of the box 24. The lifting unit 100 includes a rod 116 which extends between the front side and the back side 32 of the outer wall 28 of the box 24. The rod 116 has an outside surface 118, the outside surface 118 is threaded and the outside surface 118 threadably engages the exterior wall 114 of a respective one of the end portions 112 of each of the lifts 104. The respective end portion 112 of each of the lifts 104 travels upwardly on the respective upright 106 when the rod 116 is rotated in a first direction. Conversely, the respective end portion of each of the lifts 104 travels downwardly on the respective upright 106 when the rod 116 is rotated in a second direction.

The hand crank 102 extends through the front side 30 of the outer wall 28 of the box 24 and engages the rod 116. The rod 116 is rotated in the first direction when the hand crank 102 is cranked in the first direction. Oppositely, the rod 116 is rotated in the second direction when the hand crank 102 is cranked in the second direction. A storage rack 120 is positioned on top of each of the hitch members 46 and the storage rack 120 is positioned adjacent to the front side 30 of the outer wall 28 of the box 24. The storage rack 120 can support a propane tank 121, for example, and other equipment commonly associated with camping. A propane stove 122, or other type of gaseous propane burning appliance, is positioned inside of the camper 75 defined by the box 24 and the canopy 74. The propane stove 122 may have a fuel hose 124 that is fluidly coupled to the propane tank 121 which is positioned on the storage rack 120. Additionally, a pair of bench seats 126 may each extend along a respective first lateral side 34 and second lateral side 36 of the outer wall 28 of the box 24. A heater 128 may be positioned within the camper 75 for heating the camper 75 and the heater 128 may comprise a propane heater that is in fluid communication with the propane tank 121.

In use, the trailer 12 is towed by the all terrain vehicle 20 during overnight excursions or camping trips in remote locations. Each of the panels 52 is positioned in the deployed position and the lifting unit 100 is manipulated to urge the canopy 74 into the raised condition. Each of the braces 64 is installed beneath the respective panel 52 and each of the corner supports 98 is positioned in the respective set of pockets 92. In this way the person 73 can sleep inside of the camper 75 defined by the box 24 and the canopy 74. Each of the braces 64 is removed from beneath the respective panel 52 and each of the corner supports 98 is removed from the respective set of pockets 92. Additionally, the lifting unit 100 is manipulated to collapse the canopy 74 into the box 24 and each of the panels 52 is positioned in the closed position. In this way the trailer 12 is facilitated to be towed by the all terrain vehicle 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. The camper trailer assembly having dimensions being sufficiently small to tow behind an all terrain vehicle, said assembly comprising:
   a trailer having a hitch and a pair of wheels, said hitch being attachable to a hitch ball on an all terrain vehicle, said trailer having dimensions being sufficiently small to facilitate said trailer to be safely towed by the all terrain vehicle, said trailer having a frame and a box positioned on said frame;
   a pair of panels, each of said panels being hingedly coupled to said box of said trailer, each of said panels being positionable in a closed position having said panels closing said box, each of said panels being positionable in a deployed position having each of said panels extending laterally away from said box such that each of said panels defines a pair of sleeping areas;
   a canopy being attached to said box, said canopy being collapsed within said box when said panels are in said closed position, said canopy being urgeable into a raised condition when said panels are in said deployed position such that said canopy and said box define a camper;
   a lifting unit being movably integrated into said box, said lifting unit being in communication with said canopy, said lifting unit including a hand crank, said lifting unit urging said canopy into said raised condition when said hand crank is cranked in a first direction, said lifting unit urging said canopy to collapse into said box when said hand crank is cranked in a second direction;

wherein said box has a bottom wall and an outer wall extending upwardly from said bottom wall, said outer wall having a front side, a back side, a first lateral side and a second lateral side, said outer wall having a top edge defining an opening into said box, said bottom wall resting on said frame of said trailer, said outer wall having a door being hingedly integrated into said back side for entering and exiting said box;

wherein said trailer has a pair of fenders each being disposed on a respective one of said first lateral side and said second lateral side of said outer wall of said box, each of said wheels being positioned beneath a respective one of said fenders;

wherein said hitch includes a pair of hitch members each extending forwardly with respect to said front side of said outer wall of said box, said hitch members intersecting each other at a point spaced from said front side, said hitch including a ball receiver being disposed on said point at which said hitch members intersect for engaging the hitch ball on the all terrain vehicle;

wherein each of said panels has a front end, a back end and an outer surface extending between said front end and said back end, said outer surface having a lateral side and an upper side, each of said panels being elongated between said front end and said back end;

wherein an intersection between said lateral side and said upper side of said outer surface of each of said panels is hingedly coupled to a respective one of said first lateral side and said second lateral side of said outer wall of said box of said trailer;

wherein said lateral side of said outer surface of each of said panels abuts said respective first lateral side or second lateral side of said outer wall of said box when said panels are in said deployed position having said upper side of said outer surface of each of said panels lying on a horizontal plane, each of said panels extending between said front side and said back side of said outer wall of said box of said trailer; and wherein said upper side of said outer surface of each of said panels rests on said top edge of said outer wall of said box when said panels are positioned in said closed position such that said panels close said opening defined by said top edge.

2. The assembly according to claim 1, further comprising a plurality of braces, each of said braces comprising a tube slidably receiving a member such that each of said braces has a telescopically adjustable length, said tube of each of said braces having a locking element which releasably engages said member of a respective brace for retaining said respective brace at a desired length, an upper end of said tube of each of said braces being hingedly coupled to an outer surface of a respective one of said panels, each of said braces being positionable in a deployed position when said respective panel is positioned in said deployed position having each of said braces extending between said respective panel and a support surface wherein each of said panels is configured to support the weight of a person lying on said sleeping surface.

3. The assembly according to claim 1, wherein said canopy has a perimeter edge being attached to each of said panels and said top edge of said box corresponding to each of said front side and said back side of said outer wall of said box, said perimeter edge of said canopy extending around said upper surface of each of said panels.

4. The camper trailer assembly having dimensions being sufficiently small to tow behind an all terrain vehicle, said assembly comprising:

a trailer having a hitch and a pair of wheels, said hitch being attachable to a hitch ball on an all terrain vehicle, said trailer having dimensions being sufficiently small to facilitate said trailer to be safely towed by the all terrain vehicle, said trailer having a frame and a box positioned on said frame;

a pair of panels, each of said panels being hingedly coupled to said box of said trailer, each of said panels being positionable in a closed position having said panels closing said box, each of said panels being positionable in a deployed position having each of said panels extending laterally away from said box such that each of said panels defines a pair of sleeping areas;

a canopy being attached to said box, said canopy being collapsed within said box when said panels are in said closed position, said canopy being urgeable into a raised condition when said panels are in said deployed position such that said canopy and said box define a camper;

a lifting unit being movably integrated into said box, said lifting unit being in communication with said canopy, said lifting unit including a hand crank, said lifting unit urging said canopy into said raised condition when said hand crank is cranked in a first direction, said lifting unit urging said canopy to collapse into said box when said hand crank is cranked in a second direction;

wherein said box has a bottom wall and an outer wall extending upwardly from said bottom wall, said outer wall having a front side, a back side, a first lateral side and a second lateral side, said outer wall having a top edge defining an opening into said box, said bottom wall resting on said frame of said trailer, said outer wall having a door being hingedly integrated into said back side for entering and exiting said box;

wherein said trailer has a pair of fenders each being disposed on a respective one of said first lateral side and said second lateral side of said outer wall of said box, each of said wheels being positioned beneath a respective one of said fenders;

wherein said hitch includes a pair of hitch members each extending forwardly with respect to said front side of said outer wall of said box, said hitch members intersecting each other at a point spaced from said front side, said hitch including a ball receiver being disposed on said point at which said hitch members intersect for engaging the hitch ball on the all terrain vehicle;

wherein said canopy has a front wall, a back wall and a top wall extending between said front wall and said back wall, said top wall curving upwardly from said box and said panels when said canopy is in said raised condition, each of said front wall and said back wall lying on a plane being oriented coplanar with a respective one of said front side and said back side of said outer wall of said box when said canopy is in said raised condition;

wherein said canopy has a pair of back windows each being integrated into said back wall of said canopy;

wherein said canopy has a pair of front windows each being integrated into said front wall of said canopy;

wherein said canopy has a doorway being integrated into said back wall to facilitate entering and exiting said camper defined by said canopy and said box, said doorway having a window being integrated into said doorway, said doorway being aligned with said door in said back side of said outer wall of said box; and wherein said canopy having a plurality of pockets each being integrated into an inside surface of said canopy, said plurality of pockets including a plurality of sets of pockets, each of said sets of pockets being positioned adjacent to an intersection between said perimeter edge of said canopy and an intersection between a respective one of said front wall and said back wall of said canopy, each of said sets of pockets being spaced apart from each other and being directed toward each other.

5. The assembly according to claim 4, further comprising a plurality of corner supports, each of said corners supports being positionable to extend between each of a respective one of said sets of pockets to facilitate said top wall of said canopy to be spaced from said upper surface of each of said panels when said panels are in said deployed position and said canopy is in said raised condition.

6. The camper trailer assembly having dimensions being sufficiently small to tow behind an all terrain vehicle, said assembly comprising:

a trailer having a hitch and a pair of wheels, said hitch being attachable to a hitch ball on an all terrain vehicle, said trailer having dimensions being sufficiently small to facilitate said trailer to be safely towed by the all terrain vehicle, said trailer having a frame and a box positioned on said frame;

a pair of panels, each of said panels being hingedly coupled to said box of said trailer, each of said panels being positionable in a closed position having said panels closing said box, each of said panels being positionable in a deployed position having each of said panels extending laterally away from said box such that each of said panels defines a pair of sleeping areas;

a canopy being attached to said box, said canopy being collapsed within said box when said panels are in said closed position, said canopy being urgeable into a raised condition when said panels are in said deployed position such that said canopy and said box define a camper;

a lifting unit being movably integrated into said box, said lifting unit being in communication with said canopy, said lifting unit including a hand crank, said lifting unit urging said canopy into said raised condition when said hand crank is cranked in a first direction, said lifting unit urging said canopy to collapse into said box when said hand crank is cranked in a second direction;

wherein said box has a bottom wall and an outer wall extending upwardly from said bottom wall, said outer wall having a front side, a back side, a first lateral side and a second lateral side, said outer wall having a top edge defining an opening into said box, said bottom wall resting on said frame of said trailer, said outer wall having a door being hingedly integrated into said back side for entering and exiting said box;

wherein said trailer has a pair of fenders each being disposed on a respective one of said first lateral side and said second lateral side of said outer wall of said box, each of said wheels being positioned beneath a respective one of said fenders;

wherein said hitch includes a pair of hitch members each extending forwardly with respect to said front side of said outer wall of said box, said hitch members intersecting each other at a point spaced from said front side, said hitch including a ball receiver being disposed on said point at which said hitch members intersect for engaging the hitch ball on the all terrain vehicle;

wherein said lifting unit comprises a pair of lifts, each of said lifts including a pair of uprights and a cross member slidably engaging each of said uprights, each of said uprights extending upwardly from said bottom wall of said box;

wherein said cross member includes a central portion extending between a pair of end portions, each of said end portions being perpendicularly oriented with said central portion, each of said end portions being substantially hollow;

wherein each of said end portions slidably receives a respective one of said uprights;

wherein each of said end portions has an exterior wall, said exterior wall of each of said uprights being threaded; and wherein each of said lifts is positioned adjacent to a respective one of said front side and said back side of said outer wall of said box having said central portion of said cross member of each of said lifts extending laterally across said respective front side and said back side of said outer wall of said box.

7. The assembly according to claim 6, wherein said lifting unit includes a rod extending between said front side and said back side of said outer wall of said box, said rod having an outside surface, said outside surface being threaded, said outside surface threadably engaging said exterior wall of a respective one of said end portions of each of said lifts.

8. The assembly according to claim 7, wherein:

said respective end portion of each of said lifts travels upwardly on said respective upright when said rod is rotated in a first direction; and said respective end portion of each of said lifts travels downwardly on said respective upright when said rod is rotated in a second direction.

9. The assembly according to claim 8, wherein said hand crank extends through said front side of said outer wall of said box and engages said rod, said rod being rotated in said first direction when said hand crank is cranked in said first direction, said rod being rotated in said second direction when said hand crank is cranked in said second direction.

10. The assembly according to claim 1, further comprising:

a plurality of braces, each of said braces comprising a tube slidably receiving a member such that each of said braces has a telescopically adjustable length, said tube of each of said braces having a locking element which releasably engages said member of a respective brace for retaining said respective brace at a desired length, an upper end of said tube of each of said braces being hingedly coupled to an outer surface of a respective one of said panels, each of said braces being positionable in a deployed position when said respective panel is positioned in said deployed position having each of said braces extending between said respective panel and a support surface wherein each of said panels is configured to support the weight of a person lying on said sleeping surface;

said canopy having a perimeter edge being attached to each of said panels and said top edge of said box corresponding to each of said front side and said back side of said outer wall of said box, said perimeter edge of said canopy extending around said upper surface of each of said panels, said canopy having a front wall, a back wall and a top wall extending between said front wall and said back wall, said top wall curving upwardly from said box and said panels when said canopy is in said raised condition, each of said front wall and said back wall lying on a plane being oriented coplanar with a respective one of said front side and said back side of said outer wall of said box when said canopy is in said raised condition, said canopy having a pair of back windows each being integrated into said back wall of said canopy, said canopy having a pair of front windows each being integrated into said front wall of said canopy, said canopy having a doorway being integrated into said back wall to facilitate entering and exiting said camper defined by said canopy and said box, said doorway having a window being integrated into said doorway, said doorway being aligned with said door in said back side of said outer wall of said box, said canopy having a plurality of pockets each being integrated into an inside surface of said canopy, said plurality of pockets including a plurality of sets of pockets, each of said sets of pockets being positioned adjacent to an intersection between said perimeter edge of said canopy and an intersection between a respective one of said front wall and said back wall of said canopy, each of said sets of pockets being spaced apart from each other and being directed toward each other;

a plurality of corner supports, each of said corners supports being positionable to extend between each of a respective one of said sets of pockets to facilitate said top wall of said canopy to be spaced from said upper surface of each of said panels when said panels are in said deployed position and said canopy is in said raised condition; and said lifting unit comprising:

a pair of lifts, each of said lifts including a pair of uprights and a cross member slidably engaging each of said uprights, each of said uprights extending upwardly from said bottom wall of said box, said cross member including a central portion extending between a pair of end portions, each of said end portions being perpendicularly oriented with said central portion, each of said end portions being substantially hollow, each of said end portions slidably receiving a respective one of said uprights, each of said end portions having an exterior wall, said exterior wall of each of said uprights being threaded, each of said lifts being positioned adjacent to a respective one of said front side and said back side of said outer wall of said box having said central portion of said cross member of each of said lifts extending laterally across said respective front side and said back side of said outer wall of said box; and a rod extending between said front side and said back side of said outer wall of said box, said rod having an outside surface, said outside surface being threaded, said outside surface threadably engaging said exterior wall of a respective one of said end portions of each of said lifts, said respective end portion of each of said lifts travelling upwardly on said respective upright when said rod is rotated in a first direction, said respective end portion of each of said lifts travelling downwardly on said respective upright when said rod is rotated in a second direction, said hand crank extending through said front side of said outer wall of said box and engaging said rod, said rod being rotated in said first direction when said hand crank is cranked in said first direction, said rod being rotated in said second direction when said hand crank is cranked in said second direction.

\* \* \* \* \*